(12) United States Patent
Dumitru et al.

(10) Patent No.: US 9,070,114 B2
(45) Date of Patent: Jun. 30, 2015

(54) METHOD FOR RECEIVING EMAIL ATTACHMENT ON A PORTABLE ELECTRONIC DEVICE

(75) Inventors: Dan Dumitru, Atlanta, GA (US);
Eshwar Stalin, Atlanta, GA (US);
Rakesh Arora, Burlington (CA)

(73) Assignee: BlackBerry Limited, Waterloo, Ontario (CA)

( * ) Notice: Subject to any disclaimer, the term of this patent is extended or adjusted under 35 U.S.C. 154(b) by 506 days.

(21) Appl. No.: 11/562,102

(22) Filed: Nov. 21, 2006

(65) Prior Publication Data
US 2008/0120360 A1 May 22, 2008

(51) Int. Cl.
G06F 15/16 (2006.01)
G06Q 10/10 (2012.01)
H04L 12/58 (2006.01)

(52) U.S. Cl.
CPC .......... *G06Q 10/107* (2013.01); *H04L 12/5895* (2013.01); *H04L 51/38* (2013.01)

(58) Field of Classification Search
CPC .... G06Q 10/107; H04L 51/08; H04L 12/584; H04L 51/38; H04L 12/5895
USPC .......................................................... 709/206
See application file for complete search history.

(56) References Cited

U.S. PATENT DOCUMENTS

| | | | |
|---|---|---|---|
| 5,845,074 A | 12/1998 | Kobata | |
| 6,023,726 A * | 2/2000 | Saksena | 709/219 |
| 6,275,850 B1 * | 8/2001 | Beyda et al. | 709/206 |
| 6,324,569 B1 * | 11/2001 | Ogilvie et al. | 709/206 |
| 6,370,163 B1 | 4/2002 | Shaffer et al. | |
| 6,385,641 B1 * | 5/2002 | Jiang et al. | 709/203 |
| 6,405,192 B1 * | 6/2002 | Brown et al. | 707/722 |
| 6,442,651 B2 | 8/2002 | Crow et al. | |
| 7,039,678 B1 * | 5/2006 | Halahmi et al. | 709/206 |
| 7,277,419 B2 | 10/2007 | McGowan | |
| 7,363,582 B2 | 4/2008 | Sylthe et al. | |
| 7,409,425 B2 * | 8/2008 | Naick et al. | 709/206 |
| 7,624,160 B2 | 11/2009 | Henderson et al. | |
| 7,796,999 B1 | 9/2010 | Martin et al. | |
| 2002/0161796 A1 * | 10/2002 | Sylthe | 707/500 |
| 2002/0188728 A1 | 12/2002 | Ballard | |

(Continued)

FOREIGN PATENT DOCUMENTS

| | | |
|---|---|---|
| EP | 1233594 A1 | 8/2002 |
| EP | 1453270 A1 | 9/2004 |
| EP | 1802055 A1 | 6/2007 |

OTHER PUBLICATIONS

"Attachment Service," Research in Motion White Paper, 2003.*

(Continued)

*Primary Examiner* — Andrew Georgandellis
(74) *Attorney, Agent, or Firm* — Fish & Richardson P.C.

(57) ABSTRACT

A method for downloading an attachment to an attachment viewer of a portable electronic device includes: sending an initial data request from the attachment viewer to a server in response to receipt of an email message including the attachment, building and storing a graph structure within the server representing a map of the attachment, encapsulating the graph structure in data having an attachment viewer readable format and sending an initial chunk of the data to the attachment viewer, the initial chunk of the data being stored on the portable electronic device. The initial chunk of the data is received by the portable electronic device prior to a request to view the attachment being selected by a user.

17 Claims, 4 Drawing Sheets

(56) References Cited

U.S. PATENT DOCUMENTS

| | | | |
|---|---|---|---|
| 2003/0011631 A1* | 1/2003 | Halahmi | 345/744 |
| 2003/0012161 A1 | 1/2003 | Cayla et al. | |
| 2003/0088580 A1 | 5/2003 | Desai et al. | |
| 2003/0093565 A1* | 5/2003 | Berger et al. | 709/246 |
| 2004/0098495 A1 | 5/2004 | Warren et al. | |
| 2005/0108363 A1 | 5/2005 | Torigoe et al. | |
| 2005/0108636 A1* | 5/2005 | Sylthe et al. | 715/525 |
| 2005/0125720 A1 | 6/2005 | Little et al. | |
| 2005/0193068 A1* | 9/2005 | Brown et al. | 709/206 |
| 2006/0026663 A1* | 2/2006 | Kortum et al. | 725/134 |
| 2006/0047729 A1 | 3/2006 | Yuan et al. | |
| 2006/0047743 A1 | 3/2006 | Yuan et al. | |
| 2006/0055693 A1 | 3/2006 | Sylthe et al. | |
| 2006/0103665 A1 | 5/2006 | Opala et al. | |
| 2006/0265510 A1 | 11/2006 | Warren et al. | |
| 2007/0037557 A1* | 2/2007 | Shao et al. | 455/414.1 |
| 2007/0091789 A1 | 4/2007 | Thukral | |
| 2007/0112973 A1* | 5/2007 | Harris et al. | 709/232 |
| 2007/0143421 A1* | 6/2007 | Vuong et al. | 709/206 |
| 2008/0039051 A1 | 2/2008 | Stalin et al. | |

OTHER PUBLICATIONS

Canadian Office Action dated Feb. 21, 2011 for related Canadian Application No. 2,568,815, 6 pp.

Non-Final Office Action; U.S. Appl. No. 11/562,118, dated Mar. 3, 2011.

Canadian Office Action mailed Dec. 6, 2011. In corresponding application No. 2,568,815.

Luis Lopes, "UMTS Bearer Performance in the Presence of the Synchronisation Channel", IEEE, 2002, pp. 1-2.

Open Mobile Alliance Ltd.: "Mobile Email Requirements — Candidate Version 1.0" OMA, Oct. 18, 2005, XP002462349.

Liljeberg M. et al:"Mowgli WWW software: improved usability of WWW in mobile WAN environments" Global Telecommunications Conference, 1996. Globecome '96. Communications: The Key to Global Prosperity London, UK Nov. 18-22, 1996, New York, NY, USA, IEEE, US, Nov. 18, 1996, pp. 33-37, XP010220169 ISBN: 978-0/7803-3336-9.

* cited by examiner

METHOD FOR RECEIVING EMAIL ATTACHMENT ON A PORTABLE ELECTRONIC DEVICE

FIELD

The present disclosure relates to portable electronic devices operating on wireless networks, in particular, to a method for receiving email attachments.

BACKGROUND

It is becoming increasingly popular to send photographs, scanned documents, slide shows, PDF documents and other types of attachments in email messages. Each attachment is provided with a filename and is linked to an email message in a manner that is well known in the art. Often, a single email message may contain multiple attachments.

On portable electronic devices, there is generally a delay between a request to view an attachment by a user and display of the attachment on the display screen of the device. The primary cause of the delay is server processing time, however, network speed is also a contributing factor. The delay can often exceed 20-30 seconds. A shorter waiting period between requesting and viewing an attachment on a portable electronic device is therefore desirable.

BRIEF DESCRIPTION OF THE DRAWINGS

The embodiments will be better understood with reference to the following Figures in which like numerals denote like parts and in which.

DETAILED DESCRIPTION

In one aspect there is provided a method for downloading an attachment to an attachment viewer of a portable electronic device, the method including: sending an initial data request from the attachment viewer to a server in response to receipt of an email message including the attachment by the portable electronic device, accessing a graph structure representing a map of the attachment from the server, the graph structure having been previously built on the server, reconstructing the graph structure in response to the initial request and encapsulating the graph structure in data having an attachment viewer readable format, the data being stored on the server and sending an initial chunk of the data to the attachment viewer, the initial chunk of the data being stored on the portable electronic device; wherein the initial chunk of the data is received prior to a request to view the attachment being sent to the server.

In another aspect there is provided a portable electronic device including: an attachment viewer stored on the portable electronic device, the attachment viewer for displaying an attachment of an email message and a server in communication with the attachment viewer, the server for building a graph structure representing the attachment, encapsulating the graph structure in data having an attachment viewer readable format and sending an initial chunk of the data to the attachment viewer; wherein the initial chunk of the data is sent prior to a request to view the attachment being sent from the attachment viewer to the server.

In yet another aspect there is provided a method for downloading data onto a portable electronic device including: sending a request from the portable electronic device to a server in order to receive an initial chunk of data from the server, the request being sent when an indication that data is available for download is provided to the portable electronic device, sending the initial chunk of data from the server to the portable electronic device in response to the request and storing the initial chunk of data on the portable electronic device; wherein the initial chunk of the data is received prior to a request to download the data being sent to the server.

Figure 1:
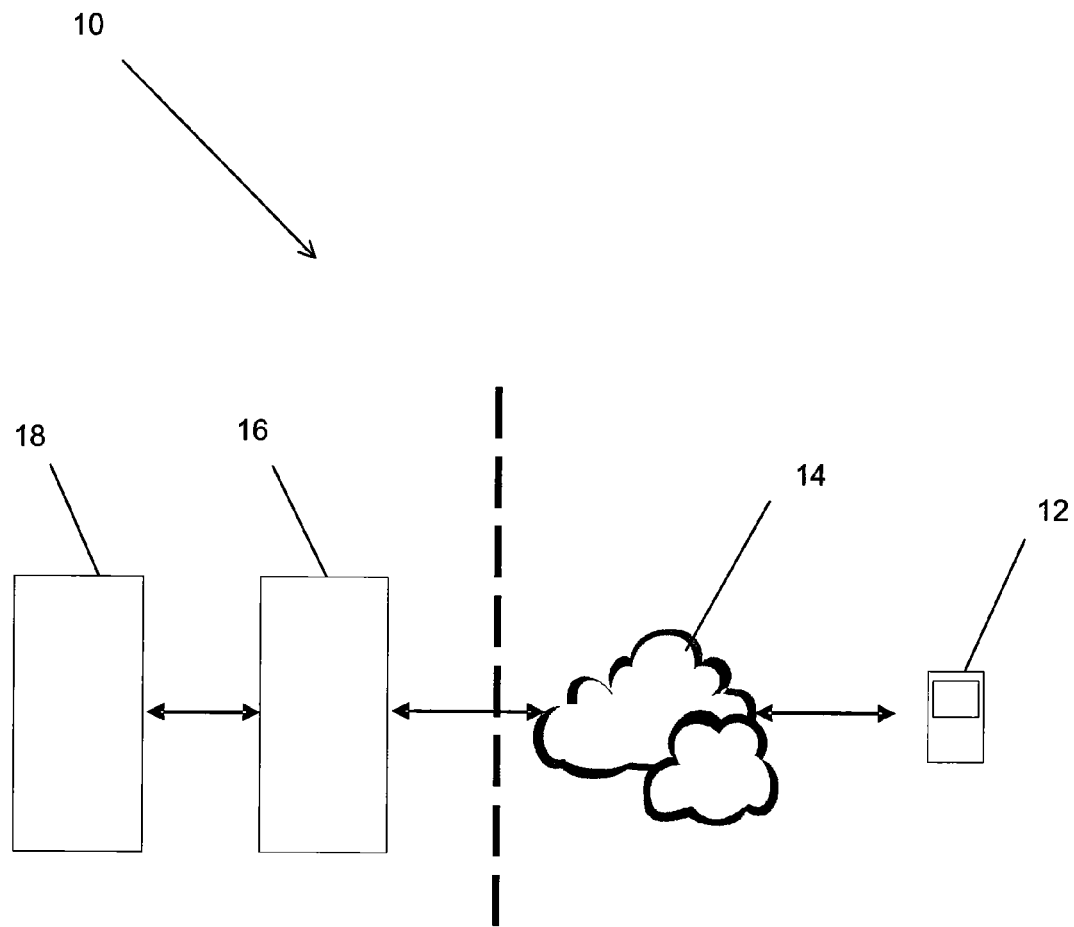
FIG. 1 is a schematic diagram of a wireless communication system.

Referring now to FIG. 1, a communication system 10 for a portable electronic device 12 is generally shown. The portable electronic device 12 is operable to effect communications over a radio communications channel and communicates with a base station (not shown) while located within a coverage area that is defined by the base station. The base station is part of a wireless network that is in communication with the Internet 14. Data is delivered to the portable electronic device 12 via wireless transmission from the base station. Similarly, data is sent from the portable electronic device 12 via wireless transmission to the base station.

It will be appreciated that the portable electronic device 12 is movable within the coverage area and can be moved to coverage areas defined by other base stations. Further, as will be understood by one of ordinary skill in the art, wireless networks include GSM/GPRS, CDPD, TDMA, iDEN, Mobitex, DataTAC networks, EDGE, EVDO or UMTS and broadband networks such as Bluetooth and variants of 802.11.

A server 18 handles wireless client requests from the portable electronic device 12. A firewall, or proxy server, 16, is provided between the server 18 and the Internet 14. The server 18 further operates as an Attachment Server, which communicates with an email client and an Attachment Viewer of the portable electronic device 12 to allow a user to view attachments that are received in email messages. While only one server 18 is shown for illustration purposes, a person skilled in the art will understand that the Attachment Server may alternatively be a separate server.

Figure 2:
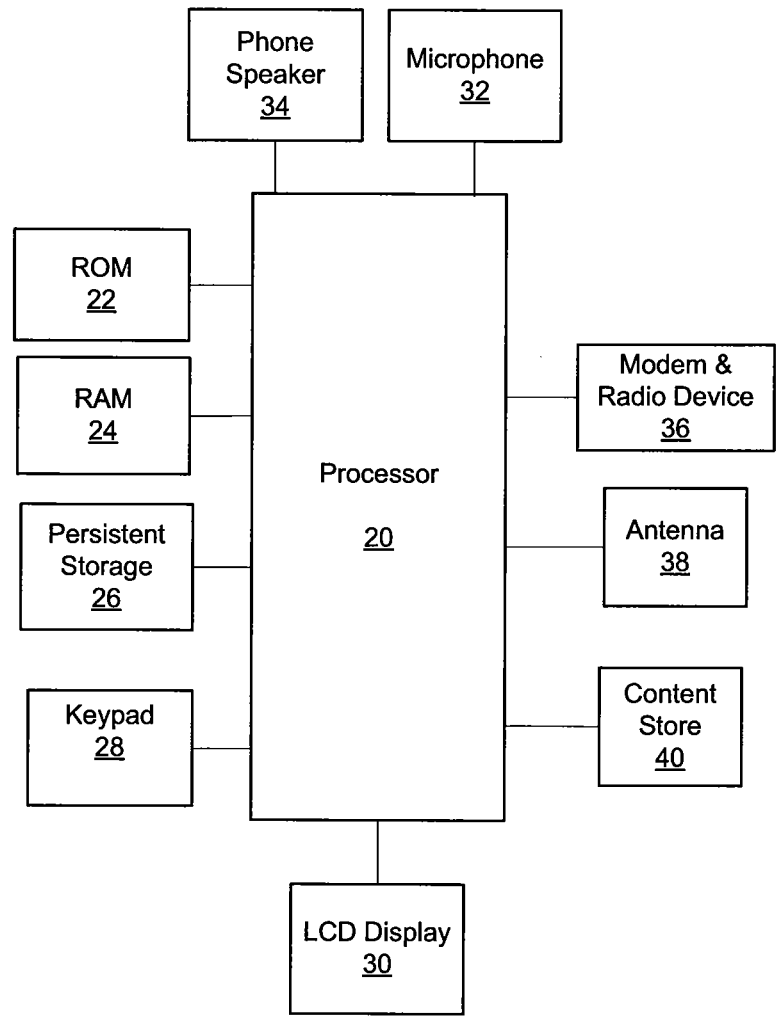
FIG. 2 is a block diagram of components of a portable electronic device according to an embodiment.

Referring now to FIG. 2, a block diagram of certain components within the portable electronic device 12 is shown. In the present embodiment, the portable electronic device 12 is based on the computing environment and functionality of a wireless personal digital assistant (PDA). It will be understood, however, that the portable electronic device 12 is not limited to wireless personal digital assistants. Other portable electronic devices are possible, such as smart telephones, and laptop computers.

The portable electronic device 12 is based on a microcomputer including a processor 20 connected to a read-only-memory (ROM) 22 that contains a plurality of applications executable by the processor 20 that enables each portable electronic device 12 to perform certain functions including, for example, PIN message functions, SMS message functions and cellular telephone functions. The processor 20 is also connected to a random access memory unit (RAM) 24 and a persistent storage device 26 which are responsible for various non-volatile storage functions of the portable electronic device 12. The processor 20 receives input from various input devices including a keypad 28. The processor 20 outputs to various output devices including an LCD display 30. A microphone 32 and phone speaker 34 are connected to the processor 20 for cellular telephone functions. The processor 20 is also connected to a modem and radio device 36. The modem and radio device 36 is used to connect to wireless networks and transmit and receive voice and data communications through an antenna 38. A content store 40, which is generally a file storage system for the portable electronic device 12, is also provided.

Request/view functionality for an attachment of an email message received by the portable electronic device 12 is provided by the Attachment Viewer and the Attachment Server. The Attachment Viewer, which is an application that is run by the processor 20 of the portable electronic device 12, displays images that correspond to attachments.

Figure 3:
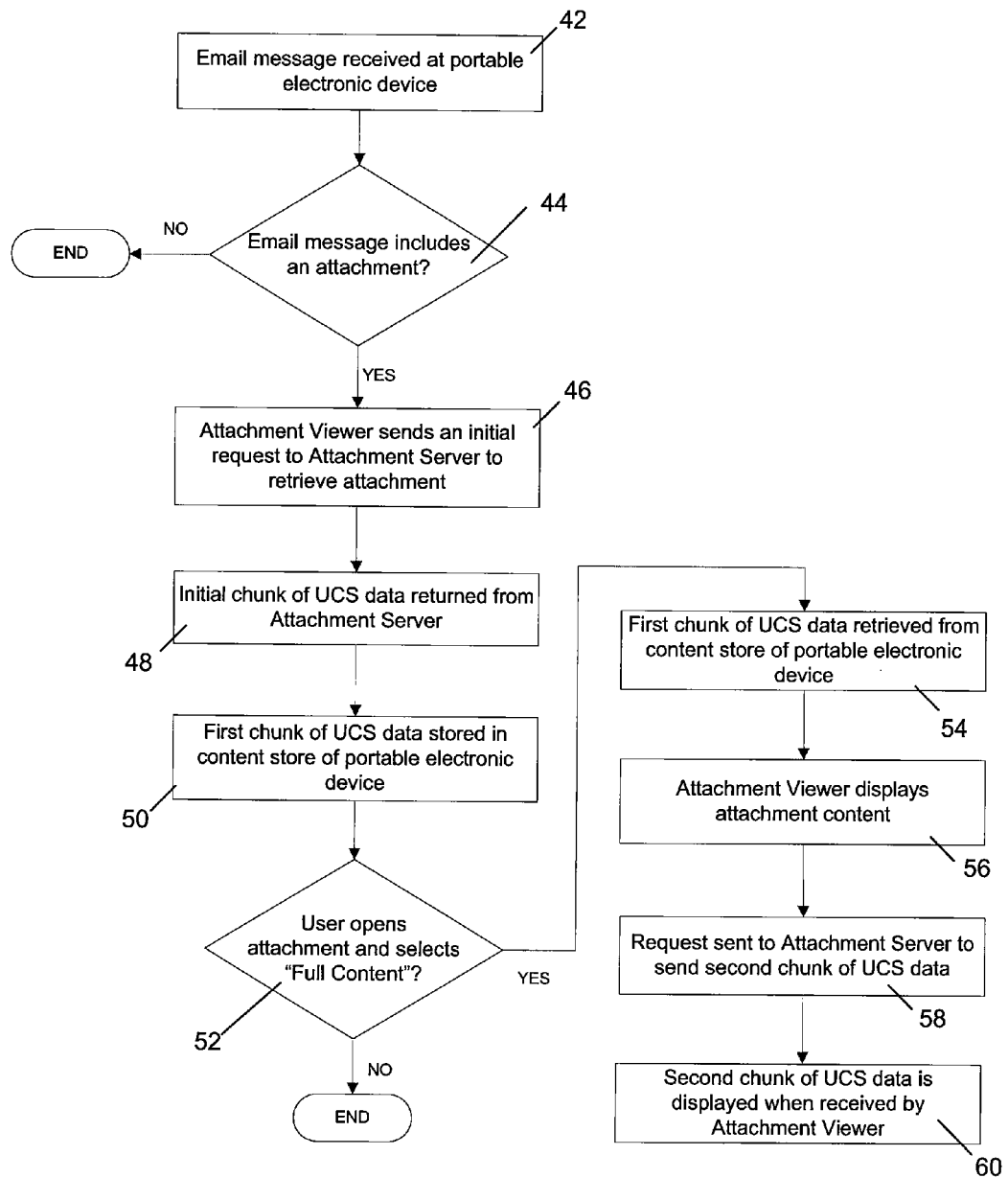
FIG. 3 is a flowchart showing device-side operation of a method for downloading data to an Attachment Viewer of the portable electronic device of FIG. 2.

Referring to FIG. 3, device-side operation of a method for downloading an attachment to an Attachment Viewer of the portable electronic device 12 is generally shown. When an email message is received by the portable electronic device 12 at step 42, the Attachment Viewer first determines whether or not the email message contains an attachment, as indicated at step 44. The Attachment Viewer is able to determine if an attachment is present by checking the email payload and searching for email components that have been marked as supported attachments. The email components are marked by an Enterprise server, which communicates with Attachment Server 18.

If the email message does not include an attachment, the logic terminates. If the email message does include an attachment, the Attachment Viewer sends an initial request to the Attachment Server 18 to retrieve the attachment, as indicated at step 46. In response to the initial request, an initial chunk of data is returned to the portable electronic device 12 and is stored in the content store 40, as indicated at steps 48 and 50, respectively. The data sent from the Attachment Server 18 is provided in Universal Content Stream (UCS) format, which is an Attachment Viewer readable format.

At step 52, the user opens the attachment and selects "Full Content" from a menu in order to view the attachment in the Attachment Viewer of the portable electronic device 12. If the user does not choose to view the attachment, the logic terminates and the initial chunk of UCS data remains in the content store 40 of the portable electronic device 12 until the email message is deleted.

In response to the "Full Content" selection by the user, the initial chunk of UCS data is retrieved from the content store 40 and displayed by the Attachment Viewer, as indicated at steps 54 and 56, respectively. The Attachment Viewer then sends a request to the Attachment Server to send a second chunk of the UCS data, as indicated at step 58. The second chunk of the UCS data is sent to the Attachment Viewer and displayed as the data is received by the portable electronic device 12, as indicated in step 60. Because auto-request optimizations by the Attachment Viewer stop following the second chunk request, subsequent chunks of UCS data are downloaded following user requests.

Figure 4:
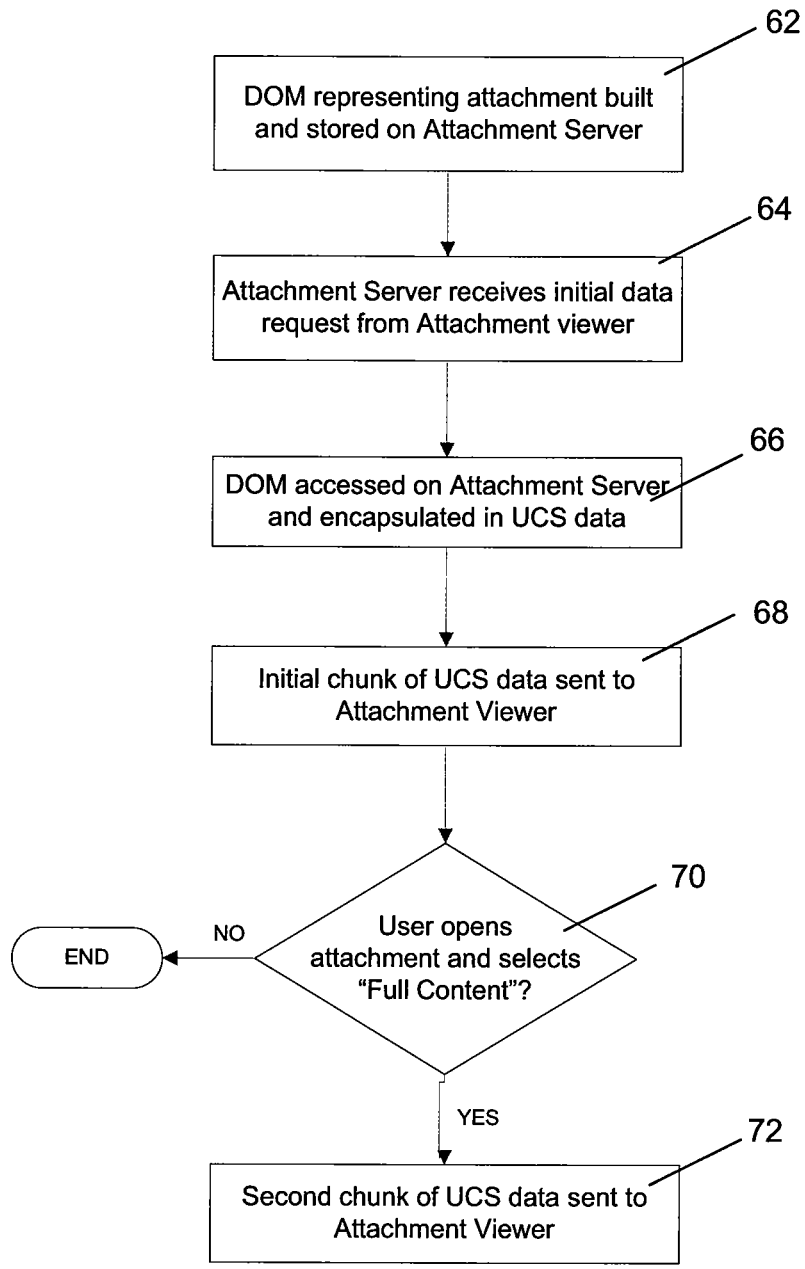
FIG. 4 is a flowchart showing server-side operation of a method for downloading data to an Attachment Viewer of the portable electronic device of FIG. 2.

Referring to FIG. 4, server-side operation of the method for downloading an attachment to an Attachment Viewer of the portable electronic device 12 is generally shown. When an email message having an attachment is received by the portable electronic device 12, as indicated at step 42 of FIG. 3, the Attachment Server 18 first builds a Document Object Model (DOM) by parsing the attachment document, as indicated at step 62 of FIG. 4. In this manner, a graph structure representing a map of the original attachment file is built within the Attachment Server 18. The DOM contains textual content, font, style and formatting attributes as well as layout attributes, such as page/slide size, positioning information (ie. x, y and z coordinates on the page), embedded graphics and tables, for example. DOM structure is well known and is disclosed in United States Patent Application Nos. 2002/0161796 and 2006/0055693, which are herein incorporated by reference.

At step 64, which corresponds to step 46 of FIG. 3, the initial request from the Attachment Viewer is received by the Attachment Server 18. Based on the request content, the DOM is accessed and components of the DOM are reconstructed in order to fulfill the request. The request typically includes: a screen size of the portable electronic device 12, the type of portable electronic device 12 and the requested UCS chunk size in Kilobytes. At step 66, the reconstructed DOM is encapsulated in UCS data and stored on the Attachment Server 18. An initial chunk of UCS data is then sent to the Attachment Viewer, as indicated at step 68, which corresponds to step 48 of FIG. 3. The initial chunk of data contains the start of the attachment. For example, the first chunk may contain the first page or multiple pages of a document depending on how many pages can fit in the requested UCS chunk size. When the user opens the attachment and selects "Full Content", as indicated at step 70, the second chunk of UCS data is sent to the portable electronic device 12, as indicated at step 72.

In operation, when a user receives an email message having an attachment at the portable electronic device 12, a first chunk of attachment data is automatically downloaded to the device 12. When the user selects to view the attachment, the first chunk is immediately displayed on the display screen 30 of the portable electronic device 12 and a request to retrieve the second chunk of attachment data is sent to the Attachment Server 18. Once the second chunk of attachment data is received, it is also displayed on the display screen 30 of the device 12.

By automatically pre-fetching and storing an initial chunk of attachment data locally on the portable electronic device 12, the Attachment Viewer is able to display attachment content immediately following a view request from a user. By the time the user has viewed the initial portion of the attachment, which is contained in the initial chunk of data, the second chunk of data will have arrived at the device 12. Thus, the user is able to view the attachment document without experiencing a significant delay following the view request.

The method for downloading data to a portable electronic device 12 is not limited to downloading attachment data from an Attachment Server. Native attachment downloads, which send attachment binary data from an Enterprise Server rather than UCS data from the Attachment Server, may also be performed. An initial chunk of data is sent once an indication that data is available for download is provided to the portable electronic device and prior to a user requesting to view the attachment. Native attachment download is useful for portable electronic devices having Microsoft Office™-type programs available. Such programs are capable of displaying .doc and .ppt files, for example, using the appropriate Office-type program on the portable electronic device. Other types of data may also be downloaded using the method disclosed herein.

A specific embodiment has been shown and described herein. However, modifications and variations may occur to those skilled in the art. All such modifications and variations are believed to be within the sphere and scope of the present embodiment.

What is claimed is:

1. A method for downloading a document attachment to an attachment viewer of a portable electronic device, the method comprising:

receiving an email message by the portable device;

determining if the email includes a document attachment;

in response to determining that the email includes a document attachment, sending a request by the attachment viewer for a first chunk of the document attachment to a server, wherein the request specifies a chunk size;

determining that multiple pages of the document attachment can fit in the specified chunk size;

receiving the first chunk of the data at the attachment viewer, the first chunk containing multiple pages of the document attachment, including the first page of the document attachment;

storing the first chunk in a cache of the portable electronic device; and, in response to the attachment viewer receiving a request to view the document attachment, retrieving the first chunk from the cache, displaying the first chunk, and sending a request for a second chunk of the document attachment to the server by the attachment viewer;

and, when the request is not received, the first chunk remains in the cache until the email message is deleted.

2. The method of claim 1, wherein the determining if the email includes a document attachment includes the attachment viewer checking the email payload and searching for email components marked as attachments.

3. The method of claim 1, wherein the first chunk is received in an attachment viewer readable format.

4. The method of claim 3, wherein the attachment viewer readable format is a Universal Content Stream (UCS) format.

5. The method of claim 1, wherein after the second chunk is received, subsequent chunks are received from the server following respective subsequent requests to the server.

6. The method of claim 1, wherein the sending the request for a second chunk of the attachment to the server by the attachment viewer occurs when the document attachment is open and a "full content" option is selected.

7. A portable electronic device, comprising:

a processor, a cache and an attachment viewer, the processor configured to:

receive an email message;

determine if the email includes a document attachment;

in response to determining that the email includes a document attachment, send a request by the attachment viewer for a first chunk of the document attachment to a server, wherein the request specifies a chunk size;

receive the first chunk of the data at the attachment viewer, the first chunk containing multiple pages of the document attachment that were previously determined to be capable of fitting in the specified chunk size, including the first page of the document attachment;

store the first chunk in the cache; and, in response to the attachment viewer receiving a request to view the attachment document, retrieve the first chunk from the cache, display the first chunk, and send a request for a second chunk of the document attachment to the server by the attachment viewer;

and, when the request is not received, the first chunk remains in the cache until the email message is deleted.

8. The device of claim 7, wherein the processor is further configured to determine if the email includes a document attachment by the attachment viewer checking the email payload and searching for email components marked as attachments.

9. The device of claim 7, wherein the first chunk is received in an attachment viewer readable format.

10. The device of claim 9 wherein the attachment viewer readable format is a Universal Content Stream (UCS) format.

11. The portable electronic device of claim 7, wherein after the second chunk is received, subsequent chunks are received from the server following respective subsequent requests to the server.

12. The portable electronic device of claim 7, wherein the request for a second chunk of the attachment is sent to the server by the attachment viewer when the document attachment is open and a "full content" option is selected.

13. A computer program product, comprising a non-transitory computer usable medium having a computer readable program code adapted to be executed to implement a method for downloading a document attachment to an attachment viewer of a portable electronic device, the method comprising:

receiving an email message by the portable device;

determining if the email includes a document attachment;

in response to determining that the email includes a document attachment, sending a request by the attachment viewer for a first chunk of the attachment to a server, wherein the request specifies a chunk size;

determining that multiple pages of the document attachment can fit in the specified chunk size;

receiving the first chunk of the data at the attachment viewer, the first chunk containing multiple pages of the document attachment, including the first page of the document attachment;

storing the first chunk in a cache of the portable electronic device; and, in response to the attachment viewer receiving a request to view the document attachment, retrieving the first chunk from the cache, displaying the first chunk, and sending a request for a second chunk of the document attachment to the server by the attachment viewer;

and, when the request is not received, the first chunk remains in the cache until the email message is deleted.

14. The computer program product of claim 13, wherein the determining if the email includes a document attachment includes the attachment viewer checking the email payload and searching for email components marked as attachments.

15. The computer program product of claim 13, wherein the first chunk is received in an attachment viewer readable format.

16. The computer program product of claim 13, wherein after the second chunk is received, subsequent chunks are received from the server following respective subsequent requests to the server.

17. The computer program product of claim 13, wherein the sending the request for a second chunk of the attachment to the server by the attachment viewer occurs when the document attachment is open and a "full content" option is selected.

* * * * *